United States Patent
Nishimura et al.

(10) Patent No.: US 9,092,113 B2
(45) Date of Patent: Jul. 28, 2015

(54) CURSOR DISPLAY METHOD AND CURSOR DISPLAY DEVICE

(75) Inventors: Osamu Nishimura, Osaka (JP);
Masataka Hirao, Suita (JP)

(73) Assignee: PASCO CORPORATION, Tokyo (JP)

( * ) Notice: Subject to any disclaimer, the term of this patent is extended or adjusted under 35 U.S.C. 154(b) by 177 days.

(21) Appl. No.: 13/582,977

(22) PCT Filed: Mar. 22, 2011

(86) PCT No.: PCT/JP2011/056746
§ 371 (c)(1),
(2), (4) Date: Sep. 5, 2012

(87) PCT Pub. No.: WO2011/122394
PCT Pub. Date: Oct. 6, 2011

(65) Prior Publication Data
US 2012/0327083 A1   Dec. 27, 2012

(30) Foreign Application Priority Data
Mar. 31, 2010  (JP) ................... 2010-084360

(51) Int. Cl.
*G06F 3/0481*   (2013.01)
*G06T 15/40*   (2011.01)
*G06T 19/00*   (2011.01)

(52) U.S. Cl.
CPC ............ *G06F 3/04815* (2013.01); *G06T 15/40* (2013.01); *G06T 19/00* (2013.01);
(Continued)

(58) Field of Classification Search
CPC ......... G06T 17/00; G06T 19/00; G06T 15/04; G06T 19/20; G06T 2200/08; G06T 15/40; G06T 2219/008
USPC ................... 345/421, 582, 620, 630
See application file for complete search history.

(56) References Cited

U.S. PATENT DOCUMENTS 6,208,347 B1 * 3/2001 Migdal et al. ............. 345/419
7,250,947 B2   7/2007 Piccuezzu et al.
(Continued)

FOREIGN PATENT DOCUMENTS

JP   11134520        5/1999
WO   2008003331 A1   1/2008
WO   2008099915 A1   8/2008

OTHER PUBLICATIONS

ISA Japan, International Search Report of PCT/JP2011/056746, Apr. 26, 2011, WIPO, 1 page.
(Continued)

*Primary Examiner* — Carlos Perromat
(74) *Attorney, Agent, or Firm* — Alleman Hall McCoy Russell & Tuttle LLP

(57) ABSTRACT

Provided is a cursor display method of displaying a cursor, indicating a focus point while being manipulatable to move, in a two-dimensional image in which sets of laser point cloud data distributed on a three-dimensional coordinate system are shown on the basis of a predetermined view point position. The cursor display method includes: performing arithmetic on a position on the three-dimensional coordinate system which corresponds to the focus point in the two-dimensional image; defining a predetermined plane graphic region, including the corresponding position and being orthogonal to a view point position direction, on the three-dimensional coordinate system on the basis of the corresponding position; dividing a view region, originating from the view point position passing through the plane graphic region, into segments on the basis of the plane graphic region; and performing non-display processing on sets of laser point cloud data placed in any one of the divided segments.

7 Claims, 6 Drawing Sheets

(52) U.S. Cl.
CPC ............... *G06F2203/04806* (2013.01); *G06T 2207/10028* (2013.01); *G06T 2210/56* (2013.01); *G06T 2219/008* (2013.01); *G09G 2340/045* (2013.01); *G09G 2340/10* (2013.01)

(56) References Cited

U.S. PATENT DOCUMENTS

| | | | |
|---|---|---|---|
| 7,643,025 | B2 | 1/2010 | Lange |
| 8,334,867 | B1 * | 12/2012 | Davidson ................ 345/419 |
| 2005/0223337 | A1 * | 10/2005 | Wheeler et al. ............ 715/806 |
| 2010/0034426 | A1 * | 2/2010 | Takiguchi et al. .......... 382/106 |
| 2010/0201682 | A1 * | 8/2010 | Quan et al. ................ 345/419 |

OTHER PUBLICATIONS

European Patent Office, Extended European Search Report of EP11762626, Jan. 7, 2014, 6 pages \* cited by examiner

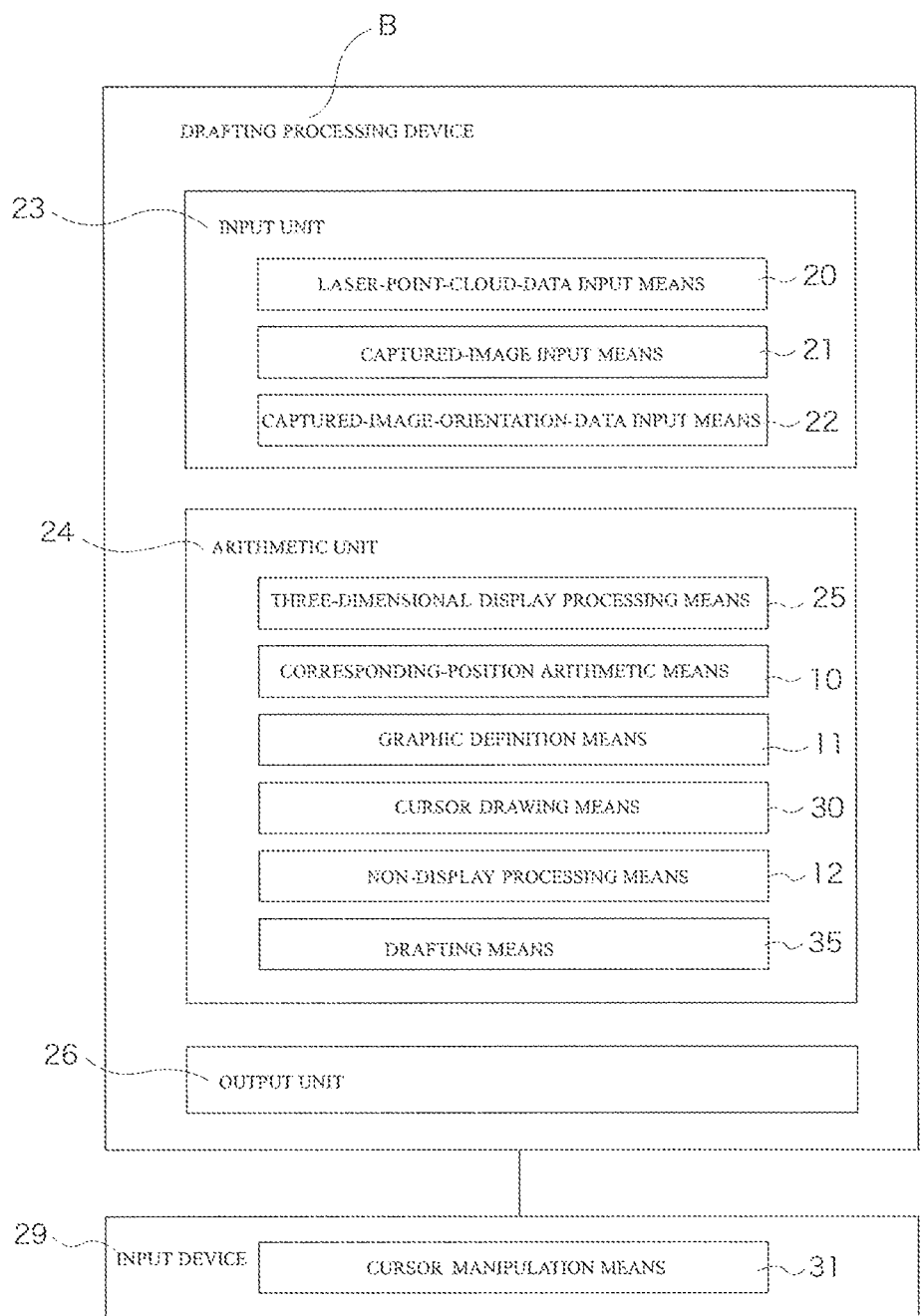

CURSOR DISPLAY METHOD AND CURSOR DISPLAY DEVICE

TECHNICAL FIELD

The present invention relates to a cursor display method.

BACKGROUND ART

When sets of laser point cloud data distributed on a three-dimensional coordinate system are subjected to pseudo-three-dimensional display in a two-dimensional image on a display, there arises problems of recognizing and indicating a position in a depth direction of the two-dimensional image. In this respect, Patent Document 1 describes a method in which: a captured image captured by a camera is displayed while superimposed on the sets of laser point cloud data, thereby allowing positions in the depth direction to be recognized intuitively; based on the captured image, an observed image point is designated in the two-dimensional image by using an arrow-shaped cursor; and based on the coordinates of the observed image point, a set of laser point cloud data whose coordinates are close to those of the observed image point is detected as a corresponding point.

PRIOR ART DOCUMENT

Patent Document

PATENT DOCUMENT 1: Japanese Patent Application Publication No. 4344869

SUMMARY OF THE INVENTION

Problem to be Solved by the Invention

The aforementioned conventional example, however, has a disadvantage of low flexibility.

Specifically, the conventional example essentially requires the captured image captured by the camera for recognizing the positions in the depth direction of the two-dimensional image. Thus, the captured image captured by the camera needs to be acquired in accordance with the three-dimensional display of the sets of laser point cloud data in the two-dimensional image, and moreover, the absence of such a captured image prevents the recognition or the like of the positions in the depth direction.

The present invention has been made to solve the disadvantage. An object thereof is to provide a cursor display method of displaying a cursor enabling recognition and indication of a position in a depth direction of a two-dimensional image. In addition, another object of the invention of this application is to provide a cursor display device for displaying the cursor enabling recognition and indication of a position in the depth direction of the two-dimensional image.

Means for Solving the Problem

The present invention achieves the foregoing objects by providing a cursor display method of displaying a cursor 2 in a two-dimensional image in which sets of laser point cloud data 1 distributed on a three-dimensional coordinates system are shown on the basis of a predetermined view point position, the cursor indicating a focus point while being manipulatable to move, the method comprising: performing arithmetic on a position on the three-dimensional coordinate system which corresponds to the focus point in the two-dimensional image, and defining a predetermined plane graphic region 3, including the corresponding position and being orthogonal to a view point position direction, on the three-dimensional coordinate system on the basis of the corresponding position, and dividing a view region, originating from the view point position and passing through the plane graphic region 3, into segments on the basis of the plane graphic region 3, and performing non-display processing on sets of laser point cloud data 1 placed in any one of the divided segments.

According to the present invention, the plane graphic region 3 is defined on the three-dimensional coordinate system on the basis of the position on the three-dimensional coordinate system which corresponds to the cursor 2 shown in the two-dimensional image; and sets of laser point cloud data 1 placed in front of or behind the region in the view point position direction are non-displayed. For this reason, the position of the cursor 2 in the depth direction in the two-dimensional image can be identified by borders between the display and non-display of the sets of laser point cloud data 1 although: each set of laser point cloud data 1 is formed as a point instead of as a plane wide enough to be expressed in perspective; and despite their placement in the three-dimensional coordinate system, it is hard to recognize the spatial effect of the multiple sets of laser point cloud data 1. In addition, when the cursor 2 is manipulated to make it move in the view point position direction, the sets of laser point cloud data 1 can be newly displayed or non-displayed in sequence in accordance with their placement in the view point position direction. Observing such a change in the display makes it possible to easily recognize the distribution of the sets of laser point cloud data 1 in the depth direction of the two-dimensional image, that is, a shape represented by the sets of laser point cloud data 1.

The position in the three-dimensional coordinate system which corresponds to the cursor 2 can be obtained through a process which corresponds to the conversion of the three-dimensional coordinate system into a two-dimensional coordinate system for the two-dimensional image shown on the display, that is, so-called geometric processing, and which is performed in reverse to this geometric processing. Specifically, arithmetic can be performed on the position by using a view point position, a view point direction, and a view angle in the three-dimensional coordinate system shown in the two-dimensional image.

In addition, the shape and size of the plane graphic region 3 can be determined in consideration of visual ease-of-identification of the three-dimensional coordinates of the aforementioned sets of laser point cloud data 1. For example, as shown in embodiments to be described later, the plane graphic region 3 can be shaped into a rectangle in a front view around the focus point indicated by the cursor 2, and the length of the sides of the plane graphic region 3 can be set approximately several times as long as in the intervals at which the sets of laser point cloud data 1 are placed.

The processing of non-displaying the laser point cloud data 1 based on the plane graphic region 3 can be performed by using a technique similar to hidden-surface processing. For example, the non-display processing can be performed, by the Z-buffering method or the Z-sorting method. In the case of the Z-buffering method, only sets of laser point cloud data 1 on the nearer or farther side of the plane graphic region 3 are drawn with the distances of the pixels from the view point position taken into consideration. In the case of the Z-sorting method, the sets of laser point cloud data 1 are sequentially drawn in the depth direction in the two-dimensional image while including the plane graphic region 3.

Moreover, the overall shape of the sets of laser point cloud data 1 is difficult to intuitively recognize because of their discrete arrangement. However, when the captured image 4 is displayed superimposed on the sets of laser point cloud data 1 described above as in the aforementioned conventional example, the state of the intervals among the sets of laser point cloud data 1 can be recognized based on the captured image 4, and thus the overall shape shown by a large number of laser point cloud data 1 can be recognized intuitively. In addition, the plane graphic region 3 can thereby be recognized as showing a cross-sectional shape. The superimposed display of the sets of laser point cloud data 1 and the captured image 4 can be achieved by displaying the captured image 4 behind the sets of laser point cloud data 1 like a so-called wall paper, or by displaying either or both of the captured image 4 and the sets of laser point cloud data 1 in a semitransparent manner.

Further, it is preferable that the cursor 2 should be displayed, including a mark 5 for directly indicating the focus point, in terms of the accurate identification of its position. In this case, a general-purpose input device for a two-dimensional coordinate system, such as a mouse, can be used for the manipulation to make the mark 5 move on the three-dimensional coordinate system when manipulation for its movement in, in particular, one or two of the coordinate axis directions on the three-dimensional coordinate system and manipulation for its movement in the rest of the coordinate axis directions are designed to be achieved separately. In this case, the distribution of the sets of laser point cloud data 1 on a particular coordinate axis can be recognized efficiently by holding the coordinate designated by the moving manipulation in one direction and moving the mark 5 in accordance with the moving manipulation in the other direction. Incidentally, the aforementioned mark 5 can be appropriately shaped like a point, a cross mark or the like.

Additionally, the position in the depth direction of the two-dimensional image becomes easy to recognize intuitively when a posture of the aforementioned plane graphic region 3 is defined as one orthogonal to the view point position direction, for example, one parallel to a coordinate plane of the two-dimensional coordinate system or one in which a plane normal line originating from the drawing center passes through the view point position. In addition, if the posture is designed to be manipulatable for its change, the position can be efficiently recognized and indicated in a case where the distribution or the like of the sets of laser point cloud data 1 has a specific orientation. Also, if the posture of the plane graphic region 3 is designed to be manipulatable for its change as described above, the distribution of the sets of laser point cloud data 1, which is difficult to recognize from the taking position of the captured image 4 due to an obstacle and the like, can be recognized in a case where, for example, the plane graphic region 3 is superimposed on the aforementioned captured image 4.

Moreover, if at least an outer edge portion of the plane graphic region 3 is displayed in an identifiable way, the arrangement in the two-dimensional image can become easy to recognize intuitively. Specifically, this can be achieved by making the plane graphic region 3 in such a manner that a frame line is placed around the outer edge portion, and by coloring the entire plane graphic region 3. Besides, making the plane graphic region 3 semitransparent can substitute the aforementioned non-display processing. In this case, the semitransparent display makes it possible to recognize the distribution of the sets of laser point cloud data 1 even in front of and behind the plane graphic region 3.

Further, when the plane graphic region 3 is displayed in an enlarged manner in another window (an enlarged display window 7) in addition to the pseudo-three-dimensional display window 6 for displaying the sets of laser point cloud data 1 described above on the display, the extremely detailed laser point cloud data 1 can be favorably recognized. Still further, when a window (a plane-view display window 8) for displaying a captured image in a plane view is provided and the position of the plane graphic region 3 on the plane coordinate system is displayed by using a cursor 9 separate from the cursor 2 described above, these make it possible to recognize the position of the plane graphic region 3 easily.

The foregoing cursor display method can be achieved by a cursor display device for displaying the cursor 2 in the two-dimensional image in which the sets of laser point cloud data 1 distributed on the three-dimensional coordinate system are shown on the basis of the predetermined view point position, the cursor indicating the focus point while being manipulatable to move, the cursor display device including:

corresponding-position arithmetic means 10 configured to perform arithmetic on the position on the three-dimensional coordinate system which corresponds to the focus point in the two-dimensional image;

graphic definition means 11 configured to define the predetermined plane graphic region 3, including the corresponding position and being orthogonal to the view point position direction on the three-dimensional coordinate system, on the basis of the corresponding position; and non-display processing means 12 configured to divide the view region, which originates from the view point position and passes through the plane graphic region 3, into segments on the basis of the plane graphic region 3, and to perform non-display processing on sets of laser point cloud data 1 which are placed in any one of the divided segments.

Effect of the Invention

As clear from the description above, the present invention can favorably achieve the recognition and indication of the positions of the sets of laser point cloud data, which are distributed on the three-dimensional coordinate system, in the depth direction of the two-dimensional image, and thus can also enhance the work efficiency of laser measurement, for example.

BRIEF DESCRIPTION OF THE DRAWINGS

FIG. 4 is an enlarged diagram of a chief part for explaining how a cursor is displayed.

FIG. 5 is a diagram showing another embodiment.

BEST MODES FOR CARRYING OUT THE INVENTION

Figure 1:
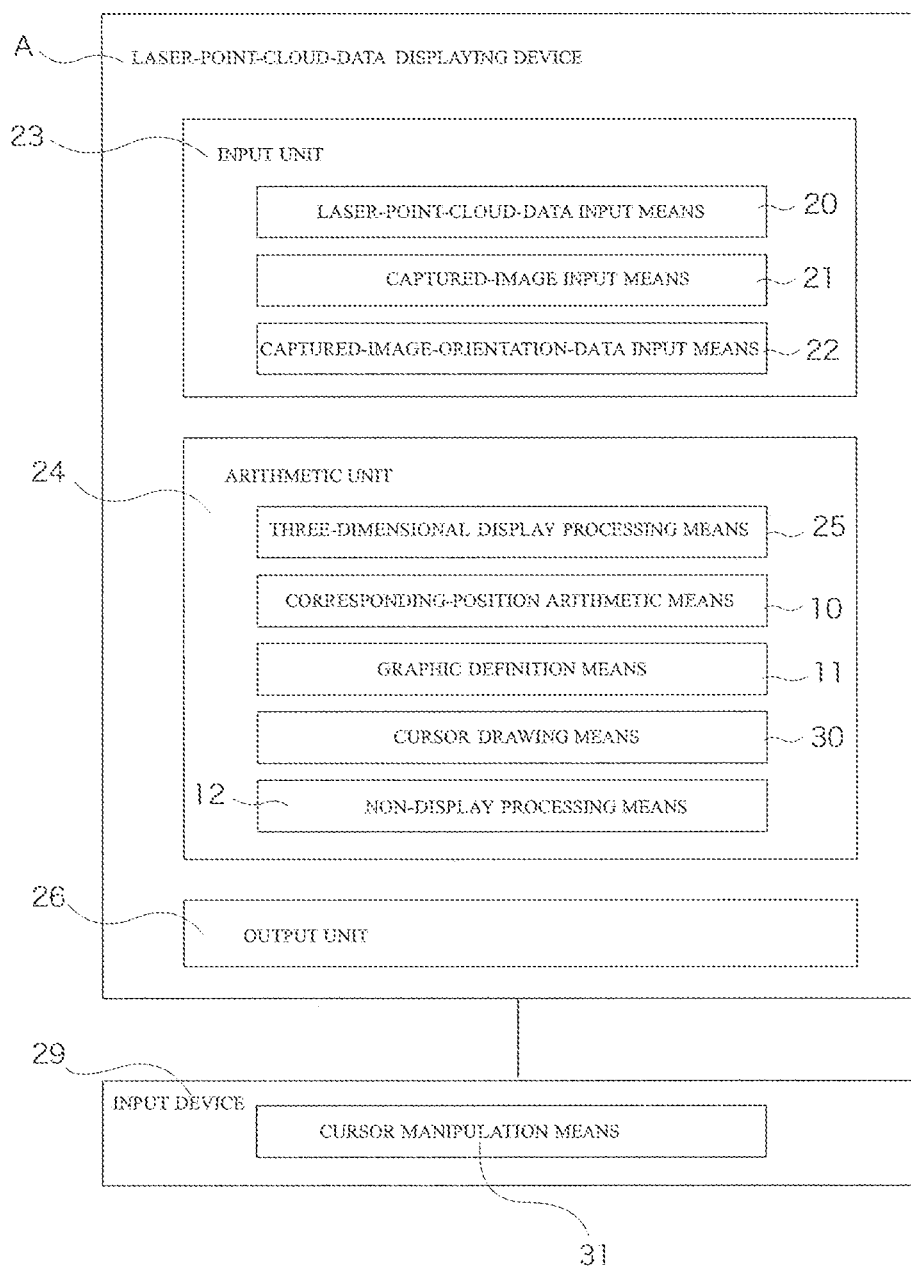
FIG. 1 is a diagram of a hardware configuration of a laser-point-cloud-data displaying device configured to perform cursor display of the present invention.

FIG. 1 to FIG. 4B show an embodiment in which the present invention is applied to a laser-point-cloud-data displaying device A displaying sets of laser point cloud data 1 and a captured image 4 captured by a camera in a superimposed manner. In this embodiment, the laser-point-cloud-data displaying device A displays the sets of laser point cloud data 1 obtained by measuring a road from an automobile by using a laser and the captured image 4 captured by the camera in the superimposed manner for the purpose of creating a road register as in the aforementioned conventional example.

The laser-point-cloud-data displaying device A is made from a computer into which software for displaying the sets of laser point cloud data 1 and the captured image 4 in the superimposed manner is installed. The laser-point-cloud-data displaying device A includes an input unit 23 having: laser-point-cloud-data input means 20 for inputting the sets of laser point cloud data 1 consisting of three-dimensional coordinate observed points identified by the laser measurement; captured-image input means 21 for inputting the captured image 4 captured by the camera; and captured-image-orientation-data input means 22 for inputting orientation data of the captured image 4. Specifically, the orientation data includes a taking position, a taking direction, and a focal length of the camera on a three-dimensional coordinate system.

The data inputted from the input unit 23 described above can be outputted as a two-dimensional image to be pseudo-three-dimensionally displayed on a display by three-dimensional display processing means 25 of an arithmetic unit 24, or in accordance with an arithmetic process using the software for displaying the sets of laser point cloud data 1 and the captured image 4 in the superimposed manner as described above. In this embodiment, the two-dimensional image is designed to be capable of being displayed by being outputted from an output unit 26 to the display which is not shown in the drawings. Specifically, the arithmetic process performed by the three-dimensional display processing means 25 includes: displaying the captured image 4 received from the captured-image input means 21; performing an arithmetic process for projecting the sets of laser point cloud data 1 on the three-dimensional coordinate system, as corresponding to this captured image 4, in accordance with a view point position, a view point direction and a view angle corresponding to the orientation data received from the captured-image-orientation-data input means 22, that is to say, performing a process for converting the sets of laser point cloud data 1 on the three-dimensional coordinate system into those in a view point coordinate system; and displaying the sets of laser point cloud data 1 and the aforementioned captured image 4 in the superimposed manner. For example, when displaying the sets of laser point cloud data 1 on the captured image 4, the superimposed display can place the captured image 4 in a way that hides the captured image 4 behind the sets of laser point cloud data 1, or can allow the captured image 4 behind the sets of laser point cloud data 1 to be displayed through the sets of laser point cloud data 1 by making the display of the sets of laser point cloud data 1 semitransparent. Note that the sets of laser point cloud data 1 in the aforementioned view point coordinate system is eventually converted into data in a screen coordinate system in accordance with a screen of the display at the last stage.

Figure 3:
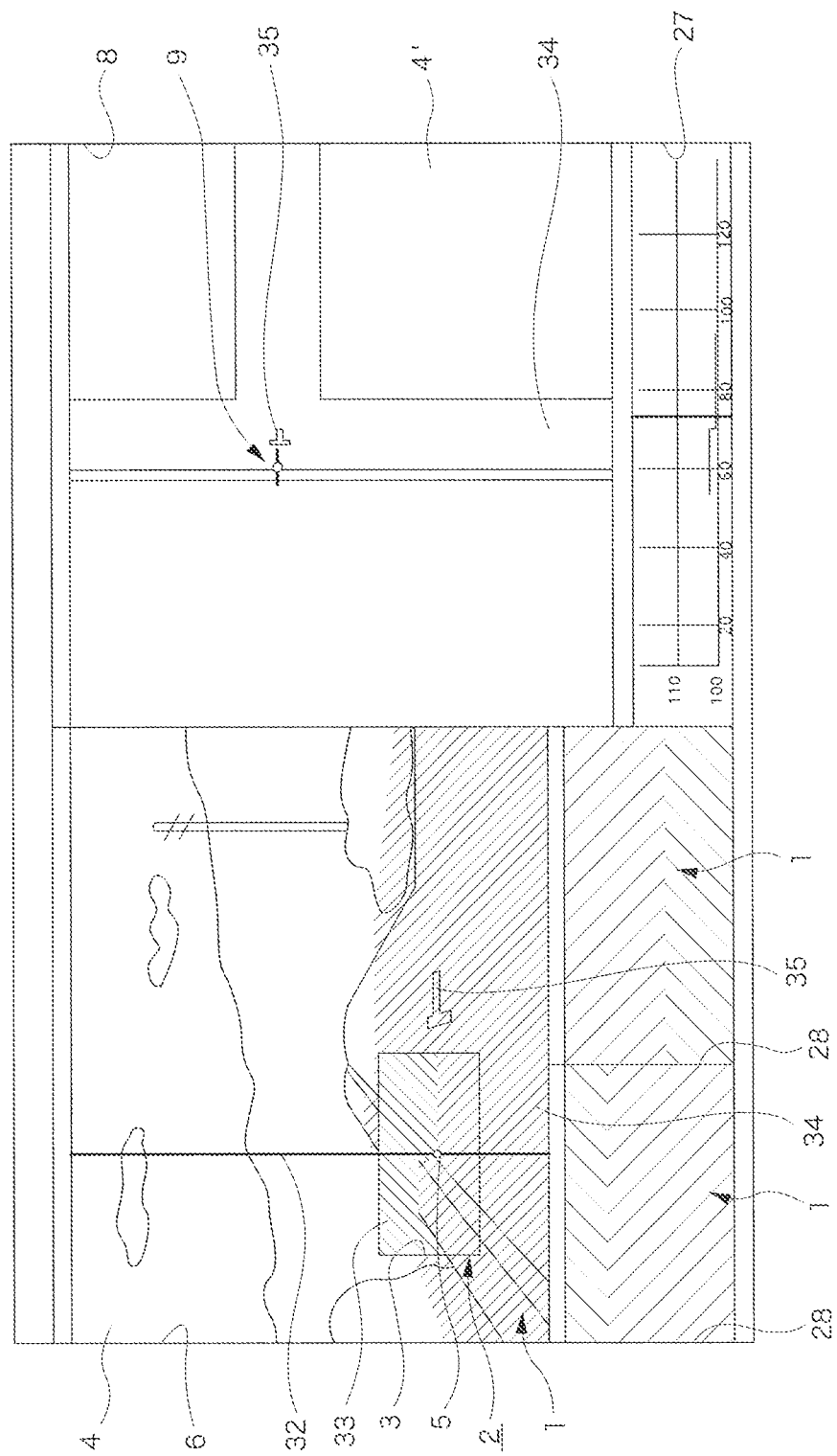
FIG. 3 is a diagram showing a displayed image on a display.

Besides, as shown in FIG. 3, the three-dimensional display processing means 25 described above has additional functions of: setting multiple windows in an image displayed on the display; setting a pseudo-three-dimensional display window 6, which is configured to display the sets of laser point cloud data 1 and the captured image 4 in the superimposed manner, in one window (an upper left window in FIG. 3); setting a plane-view display window 8, which is configured to display a captured image 4' obtained by filming a road from an airplane flying over the road, in another window (an upper right window in FIG. 3); setting a cross-sectional-direction-dimension display window 27, which is configured to display dimensions in a cross-sectional direction obtained at a position of a cursor 2 described later, in yet another window (a lower right window in FIG. 3); and setting a view-point-position direction changing window 28, which is configured to perform the displaying with the view-point-position direction changed to one taken in a different axial direction in the three-dimensional coordinate system based on the position of the cursor 2, in still another window (a lower left window in FIG. 3). For these added functions, the three-dimensional display processing means 25 includes window lay-out means, plane-view display processing means, cross-sectional-direction-dimension display processing means, and view-point-position direction changing processing means, which are not shown.

It should be noted that in FIG. 3, two types of the view-point-position direction changing window 28 are generated; one is the window obtained with the view point position changed to one taken in the X-axis direction in the three-dimensional coordinate system; and the other is the window obtained with the view point position changed to one taken in the Y-axis direction in the three-dimensional coordinate system. In addition, for the purpose of displaying the captured image 4' in the aforementioned in the plane-view display window 8, the captured image 4' of the road captured with a camera from the airplane flying over the road is inputted from the aforementioned captured-image input means 21; likewise, pieces of orientation data on the taking position and the like of the airplane are inputted from the captured-image-orientation-data input means 22; and these pieces of data are discriminated from the sets of laser point cloud data 1, the captured image 4 on which the sets of laser point cloud data 1 is superimposed, and the like by doing things such as adding appropriate codes in order to make the pieces of data recognizable as targets to be processed by the aforementioned plane-view display processing unit. Furthermore, reference numerals denote the road and a road traffic sign indicating an intersection.

Further, input devices 29, including a mouse, a keyboard and the like, are connected to the laser-point-cloud-data displaying device A. The aforementioned arithmetic unit 24 includes corresponding-position arithmetic means 10, graphic definition means 11, cursor drawing means 30, and non-display processing means 12 so that the cursor 2 can be movably displayed on the two-dimensional image of the display in accordance with the manipulation of the input device 29. The input devices 29 include cursor manipulation means 31 for, at the time of the manipulation of moving the mouse, detecting an amount and direction of its movement and outputting the amount and direction to the laser-point-cloud-data displaying device A as things such as data on the amount of the movement of the cursor 2 on the two-dimensional image on the display.

In addition, once the two-dimensional coordinates of an indicator point shown by the cursor 2 on the two-dimensional image on the display are identified according to things such as the data on the amount of the movement of the cursor 2 acquired from the cursor manipulation means 31, the corresponding-position arithmetic means 10 acquires the aforementioned view point coordinates based on the two-dimensional coordinates, namely, the screen coordinates. The view point coordinates can be acquired by performing arithmetic on the screen coordinates through a conversion which is reverse to the conversion from the view point coordinate system into the screen coordinate system.

Figure 4A:
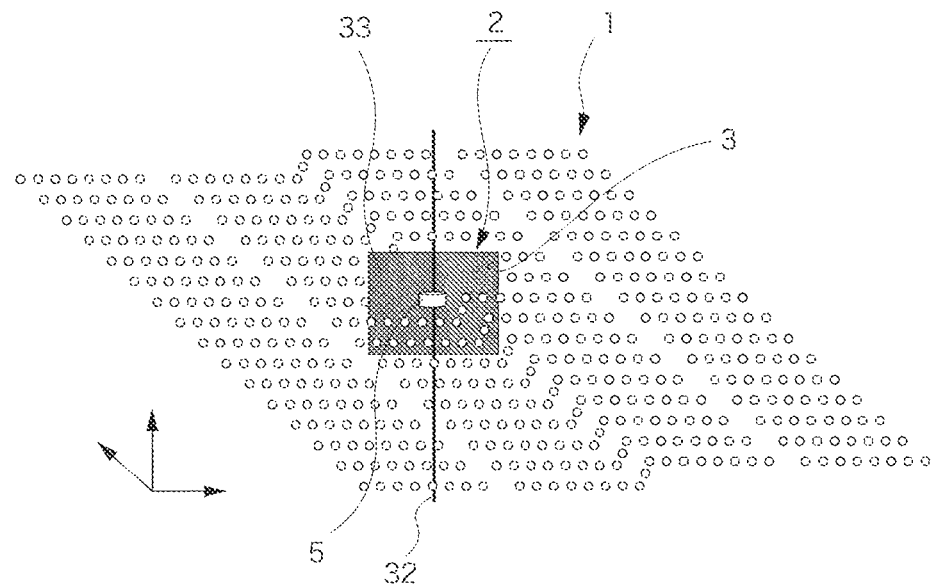
FIG. 4A illustrates a diagram of the present invention.
Figure 4B:
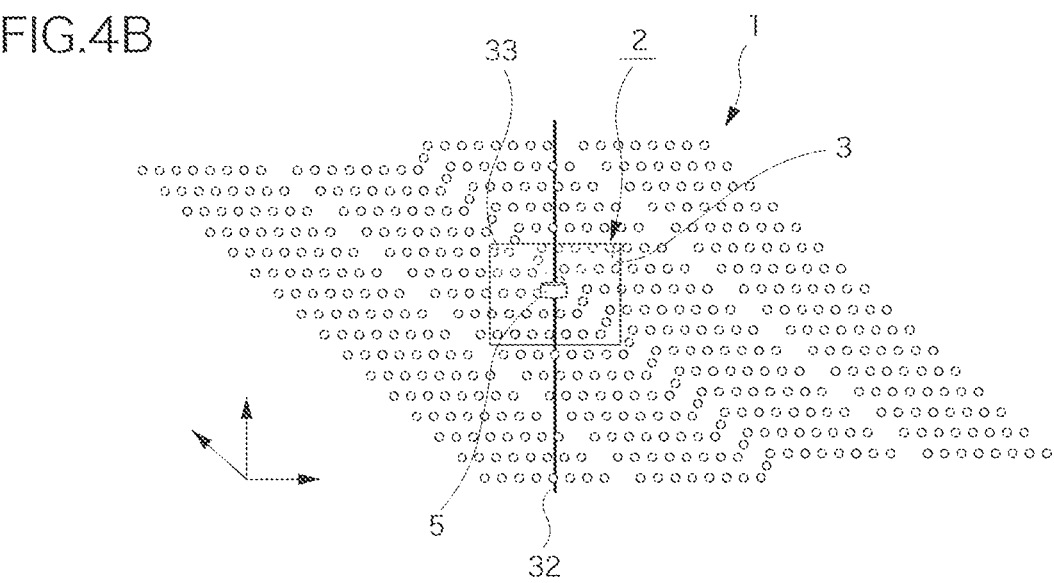
FIG. 4B illustrates a diagram of the modification of the present invention.

The graphic definition means 11 defines a preset predetermined plane graphic region 3 on the view point coordinate system in accordance with the view point coordinates acquired by the corresponding-position arithmetic means 10. In this embodiment, the predetermined plane graphic region 3 is defined with its graphic center located in the view point coordinates. The plane graphic region 3 is shaped like a rectangle, and is extremely thin in thickness. For example, the plane graphic region 3 is set as a square or an oblong whose sides are approximately five to ten times as long as the intervals at which the sets of laser point cloud data 1 are arranged, as shown in FIGS. 4A and 4B.

The cursor drawing means 30 draws a mark 5 for directly indicating the aforementioned indicator point of the cursor 2 at the screen coordinates of the indicator point, draws an indicator line 32 extending in an altitude direction through the mark 5, and draws a background plate 33 in the plane graphic region 3 together with the mark 5. In this embodiment, as shown in FIG. 4A, a columnar pattern as in the perspective view is set in advance as the aforementioned mark 5, and the background plate 33 is made nontransparent and is colored in purple, for example, so as to be easily distinguished though superimposed on the captured image 4. In addition, the cursor drawing means 30 can be configured to draw only the cursor 2 according to the mode selection of the cursor 2 between display and non-display which is inputted through the aforementioned input device 29, but not to draw anything else.

In this embodiment, the non-display processing means 12 performs non-display processing on sets of laser point cloud data 1 which are hidden behind the mark 5 or the background plate 33 drawn by the cursor drawing means 30 and thus are invisible from the view point position, and performs so-called hidden-surface processing on those sets of laser point cloud data 1 based on the view point position thereof. Specifically, for example, according to the z-sorting method, distances from the view point position to all the sets of laser point cloud data 1 and to the background plate 33 (the plane graphic region 3) are obtained, and thereafter the sets of laser point cloud data 1 are drawn in a descending order of the distances from the view point position. Thereby, the sets of laser point cloud data 1 hidden behind the background plate 33 are non-displayed.

Figure 2:
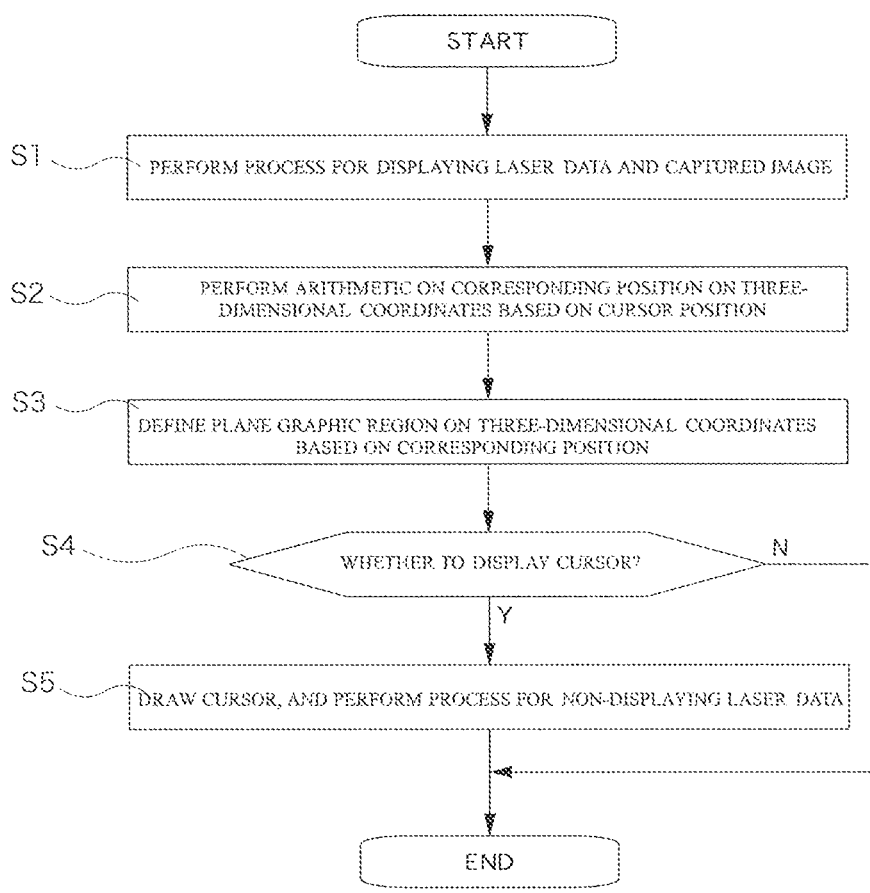
FIG. 2 is a diagram showing a flowchart of the cursor display of the present invention.

Hereinbelow, a display operation of the laser-point-cloud-data displaying device A will be described by using FIG. 2. Firstly, once the sets of laser point cloud data 1, the captured image 4, and the orientation data of the captured image 4 are inputted from the input unit 23, the three-dimensional display processing means 25 performs display processing on the sets of laser point cloud data 1 and the captured image 4 (Step S1), and thereby the sets of laser point cloud data 1 and captured image 4 are displayed on the display in the superimposed manner. Next, the corresponding-position arithmetic means 10 obtains the view point coordinates of the cursor 2 from the screen coordinates of the cursor 2 (Step S2), and the graphic definition means 11 defines the plane graphic region 3 based on the view point coordinates (Step S3). Subsequently, the mode selection between the display and non-display of the cursor 2 by the cursor drawing means 30 is checked (Step S4). When the non-display mode is selected, the display operation is completed. On the other hand, when the display mode is selected, the cursor drawing means 30 draws the cursor 2, that is, the mark 5 indicating the indicator point and the background plate 33, as well as the non-display processing means 12 performs non-display processing on the sets of laser point cloud data 1 to be hidden behind either the mark 5 or the background plate 33 (Step S5).

Accordingly, when placing the cursor 2 on a focus point on the two-dimensional image as shown in FIG. 3, an operator of the laser-point-cloud-data displaying device A can recognize the position of the focus point in the depth direction in the two-dimensional image from borders between the display of the sets of laser point cloud data 1 and the display of the background plate 33. In addition, as shown in FIG. 4A, even when the captured image 4 is not displayed in the superimposed manner, the position of the background plate 33 can be recognized intuitively from a distribution pattern of the sets of laser point cloud data 1.

Moreover, Step S2 and the ensuing steps, which have been described above, are repeated whenever the cursor 2 is moved. Thus, the operator of the laser-point-cloud-data displaying device A can check a distribution state of the sets of laser point cloud data 1 in the depth direction of the display by manipulating the mouse.

Further, in the aforementioned display processing (Step S1) of the sets of laser point cloud data 1 and the captured image 4, the following are displayed in the respective windows separate from the superimposed display of the laser point cloud data 1 and the captured image 4 described above, as shown in FIG. 3. Specifically, the aforementioned plane-view display processing means displays the captured image 4' of the road captured from the airplane. The cross-sectional-direction-dimension display processing means displays the dimensions of the plane graphic region 3 in the cross-sectional direction. The view-point-position direction changing processing means performs view-point-changed display with the view point position changed to one taken at the indicator point of the cursor 2. Incidentally, the plane-view display processing means selects the captured image 4' captured from the airplane on the basis of things such as the taking position of the captured image 4 which is displayed with the laser point cloud data 1 in the superimposed manner, displays a different cursor 9 on the captured image 4' in plane coordinates corresponding to the plane coordinates of the aforementioned cursor 2, and displays the plane graphic region 3 by using lines on the plane coordinates corresponding to the aforementioned plane coordinates of the plane graphic region 3. In contrast, the cross-sectional-direction-dimension display processing means displays the orthogonal coordinate axes of the plane graphic region 3 as the vertical and horizontal axes, together with scales of an altitude value or the like. The cross-sectional-direction-dimension display processing means also displays altitude data while projecting, on the cross-sectional-direction-dimension display window 27, the sets of laser point cloud data 1 distributed in a predetermined range in one or both of the frontward and rearward directions of the plane graphic region 3. Additionally, the view-point-position direction changing processing means displays: sets of laser point cloud data 1 which are located near the indicator point of the cursor 2 in the superimposed display at the time when the view point position is changed to one taken in the X-axis direction; and sets of laser point cloud data 1 likewise at the time when the view point position is changed to one taken in the Y-axis direction. The view-point-position direction changing processing means displays these in an enlarged manner.

Moreover, the movement of the cursor 2 in the pseudo-three-dimensional display window 6 for displaying the sets of laser point cloud data 1 and the captured image 4 in the superimposed manner is made manipulatable in only the altitude direction through input in either the upward or downward direction by using a cursor moving key on the keyboard or a mouse wheel, which are not shown in the drawings. The movement manipulation on the plane coordinates can be achieved by: manipulating the different cursor 9 displayed in the aforementioned plane-view display window 8 with the cursor 9; and making the movement follow the plane coordinates of the other cursor 9. Such movement of the cursor 2 can be achieved, for example, by: setting the coordinate axis directions of the movement for the mouse and the cursor moving keys; performing arithmetic on the position of the cursor 2 on the three-dimensional coordinate system based on data about the amount of movement of the cursor which is outputted therefrom; and reflecting the movement of the cursor 2 on the displays in the respective windows 6, 8.

Note that although the embodiment described above shows the case where the display or non-display mode for the cursor 2 is checked after the plane graphic region 3 is defined, the mode can be checked before the view point coordinates are obtained. In this case, it is possible to omit the arithmetic on view point coordinates which are unnecessary by nature.

FIG. 4B shows a modification of the present invention. Note that: in this modification and an embodiment to be described later, the same components as those in the above-described embodiment are denoted by the same reference numerals; and descriptions thereof are omitted. In this modification, the cursor drawing means 30 sets the background plate 33 semitransparent, and makes visible the sets of laser point cloud data 1 hidden behind the background plate 33 by using semitransparent display. Thus, in this modification, the distribution of the sets of laser point cloud data 1 behind the background plate 33 can be recognized, and the position of the background plate 33 can be recognized more accurately.

Figure 6:
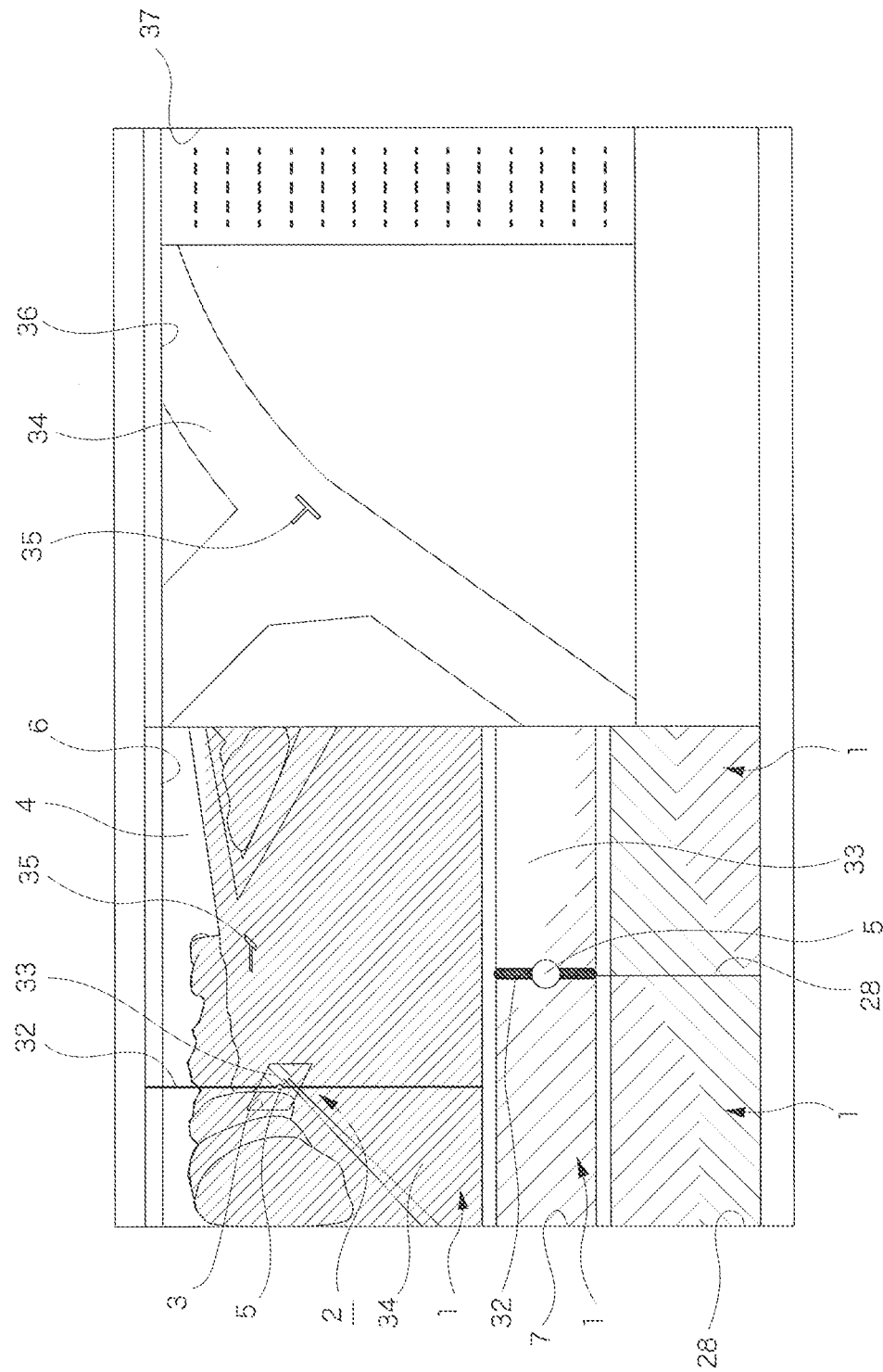
FIG. 6 is a diagram showing a displayed image on a display in another embodiment.

FIGS. 5 and 6 show another embodiment of the present invention. This embodiment represents a drafting processing device B, which is made up by adding drafting means 35 to the arithmetic unit 24 of the aforementioned laser-point-cloud-data displaying device A. The drafting processing device B is made up, for example, by incorporating the aforementioned laser-point-cloud-data displaying device A into a CAD device.

Thus, the operator can draw a road and the like in accordance with the arrangement of the sets of laser point cloud data 1. Incidentally, in FIG. 6, reference numeral 36 denotes a drafting window, and reference numeral 37 denotes a tool pallet of the CAD device. Predetermined drawing commands can be executed in response to clicks on icons or the like.

In addition, in this embodiment, the background plate 33 is made manipulatable to rotate about any one of the orthogonal coordinate axes on the plane of the background plate 33. The graphic definition means 11 defines the plane graphic region 3 in a predetermined rotated posture in accordance with the manipulation for inputting the rotated posture of the background plate 33 from the input device 29. In accordance with the rotated posture, the cursor drawing means 30 draws the background plate 33 on the view point coordinates. In accordance with the view point coordinates, the non-display processing means 12 performs non-display processing on the sets of laser point cloud data 1.

Thus, as shown in FIG. 6, it is possible to place the background plate 33 in a posture straightly facing a view point position different from the view point position based on which the sets of laser point cloud data 1 and the captured image 4 are displayed in the superimposed manner, and to identify some sets of laser point cloud data 1 hidden behind the background plate 33 in the posture. Thereby, as shown in FIG. 6, for example, the curbsides of a road extending in a direction crossing the view point direction can be recognized easily.

Further, in this embodiment, the three-dimensional display processing means 25 sets an enlarged display window 7 for displaying a vicinity of the indicator point of the cursor 2 in an enlarged manner in the screen on the display. Thereby, the operator can recognize the extremely detailed distribution of the sets of laser point cloud data 1 which are displayed with the captured image 4 in the superimposed manner. Also, in the case where the background plate 33 is rotated as described above, setting the enlarged display in the direction orthogonal to the view point position can make easily viewable the superimposed display of the sets of laser point cloud data 1 with the captured image 4.

Note that although the sets of laser point cloud data 1 acquired by using an automobile are displayed in the description above, various laser point cloud data 1 such as one acquired by using an aircraft or the like can be displayed. In addition, the rotational manipulation function of the background plate 33 and the setting of the enlarged display window 7 for displaying the vicinity of the indicator point of the cursor 2 in the enlarged manner may be added to the laser-point-cloud-data displaying device A, instead of the drafting processing device B. Thereby, the sets of laser point cloud data 1 can be made more easily viewable.

EXPLANATION OF REFERENCE NUMERALS

1 LASER POINT CLOUD DATA
2 CURSOR
3 PLANE GRAPHIC REGION
4 CAPTURED IMAGE
5 MARK
6 PSEUDO-THREE-DIMENSIONAL DISPLAY WINDOW
7 ENLARGED DISPLAY WINDOW
8 PLANE-VIEW DISPLAY WINDOW
9 ANOTHER CURSOR
10 CORRESPONDING-POSITION ARITHMETIC MEANS
11 GRAPHIC DEFINITION MEANS
12 NON-DISPLAY PROCESSING MEANS

The invention claimed is:

1. A cursor display method of displaying a cursor in a two-dimensional image in which sets of laser point cloud data subjected to pseudo-three-dimensional display are distributed on a three-dimensional coordinate system and shown on the basis of a predetermined view point position, the cursor indicating a focus point while being manipulatable to move, the method comprising:

performing arithmetic on a position on the three-dimensional coordinate system which corresponds to the focus point in the two-dimensional image, and defining a plane graphic region, including a corresponding position and being orthogonal to a view point position direction, on the three-dimensional coordinate system on the basis of the corresponding position;

drawing a background plate in the plane graphic region, the background plate being nontransparent; and dividing a view region originating from the view point position and passing through the plane graphic region into segments on the basis of the plane graphic region, and performing non-display processing on sets of laser point cloud data placed in any one of the divided segments such that borders between display and non-display of the laser point cloud data identify a position in a depth direction of the position on the three-dimensional coordinate system which corresponds to the focus point;

wherein the sets of laser point cloud data are discretely arranged and portions of the background plate that overlap the sets of laser point cloud data subjected to the non-display processing are displayed;

wherein a captured image of a target indicated by the sets of laser point cloud data from the view point position as a taking position is displayed on the two-dimensional image with the sets of laser point cloud data in a superimposed manner, where the captured image is displayed behind the sets of laser point cloud data as a wallpaper;

wherein the laser point cloud data and the captured image are obtained by using an automobile or aircraft; and wherein the non-display processing is hidden-surface processing.

2. The cursor display method according to claim 1, wherein a mark for indicating the focus point is displayed in the two-dimensional image while holding coordinates of the focus point in specific one or two of coordinate axis directions on the three-dimensional coordinate system; and being manipulatable to move in the rest of the coordinate axis directions on the three-dimensional coordinate system.

3. The cursor display method according to claim 1, wherein the plane graphic region is manipulatable to rotate about each coordinate axis of the three-dimensional coordinate system while the sets of laser point cloud data remain stationary.

4. The cursor display method according to claim 1, wherein the plane graphic region is set semitransparent, and the sets of laser point cloud data placed in a divided segment hidden behind the plane graphic region when viewed from the view point position are displayed semitransparently instead of being subjected to the non-display processing.

5. The cursor display method according to claim 1, wherein in the two-dimensional image, a pseudo-three-dimensional display window for displaying the sets of laser point cloud data distributed on the three-dimensional coordinate system on the basis of the predetermined view point position is added, and an enlarged display window for displaying the plane graphic region in an enlarged manner is set.

6. The cursor display method according to claim 5, wherein a plane display window for displaying a captured image in a plane view is set in the two-dimensional image, and another cursor for indicating the position of the plane graphic region on the basis of plane coordinates is displayed in the plane display window.

7. The cursor display method according to claim 5, wherein the sets of laser point cloud data subjected to the non-display processing are positioned behind the background plate in the depth direction, and of the sets of laser point cloud data, sets of laser point cloud data that overlap the background plate and are not subjected to the non-display processing are positioned in front of the background plate in the depth direction.

* * * * *